United States Patent [19]

Derouet et al.

[11] Patent Number: 5,099,869
[45] Date of Patent: Mar. 31, 1992

[54] DISCHARGE ARRANGEMENT FOR A PRESSURE RELIEF VALVE IN A PRESSURIZED HOT FLUID CIRCUIT OF AN AIRCRAFT

[75] Inventors: Patrick R. J. Derouet, Soignolles en Brie; Michel S. P. Lemonnier, Ris Orangis; Jean Tourneboeuf, Vaux le Penil; Roger U. Welaratne, Melun, all of France

[73] Assignee: Societe Nationale d'Etude et de Construction de Moteurs d'Aviation "S.N.E.C.M.A.", Paris, France

[21] Appl. No.: 619,436

[22] Filed: Nov. 29, 1990

[30] Foreign Application Priority Data

Nov. 29, 1989 [FR] France .................. 89 15696

[51] Int. Cl.$^5$ .................................. F16K 17/40
[52] U.S. Cl. .............................. 137/70; 137/74
[58] Field of Search ............. 137/68.1, 72, 73, 74, 137/899.2, 70; 251/118; 244/118.5, 129.4; 220/366, 367, 89.1, 89.4

[56] References Cited

U.S. PATENT DOCUMENTS

| | | | |
|---|---|---|---|
| 3,182,855 | 5/1965 | Stock | 226/89.1 |
| 3,618,627 | 11/1971 | Wagner | 137/73 |
| 4,273,251 | 6/1981 | McMahon | 137/72 X |
| 4,352,365 | 10/1982 | Boccardo et al. | 137/73 X |
| 4,402,516 | 9/1983 | Gans et al. | 277/26 |
| 4,669,493 | 6/1987 | Kober et al. | 137/73 |

FOREIGN PATENT DOCUMENTS 0191717 8/1986 European Pat. Off. .

OTHER PUBLICATIONS

Patent Abstracts of Japan, vol. 8, No. 197 (M-324), Sep. 11, 1984, & JP-A-59 086770, F. Shiyuuji, "Meltable Plug".

Primary Examiner—Martin P. Schwadron
Assistant Examiner—Kevin L. Lee
Attorney, Agent, or Firm—Oblon, Spivak, McClelland, Maier & Neustadt

[57] ABSTRACT

An arrangement for discharging to the atmosphere a jet of fluid released by a pressure relief valve in a pressurized hot fluid circuit of an aircraft, wherein the pressure relief valve is placed near a wall of the aircraft, e.g. the wall of an engine pod, so that any jet of fluid released by the valve is directed towards the wall, and the wall is provided with an orifice at the place where the fluid jet would hit the wall, the orifice being closed by a consumable plug designed to melt, at least partly, as a result of the heat of the fluid jet so that the jet is able to discharge through at least a part of the orifice.

4 Claims, 1 Drawing Sheet

DISCHARGE ARRANGEMENT FOR A PRESSURE RELIEF VALVE IN A PRESSURIZED HOT FLUID CIRCUIT OF AN AIRCRAFT

BACKGROUND OF THE INVENTION

1. Field of the Invention

The present invention relates to aircraft, and in particular to an arrangement for discharging to atmosphere a jet of fluid released by a pressure relief valve in a pressurized hot fluid circuit of an aircraft.

2. Summary of the Prior Art

An aircraft generally has several pressurized hot fluid circuits in which the pressure is regulated by means of a control valve situated in an upstream part of the circuit. The hot air circuit used for deicing is an example. This type of circuit usually includes a pressure relief valve intended to divert a portion of the compressed air to atmosphere in the event of the control valve becoming jammed in the open position, so as to avoid dangerous over-pressure in the circuit. However, for aerodynamic reasons, it is not possible to install, on the outside of the engine pods, as many discharge outlets as there are compressed air circuits to be monitored around each turbojet engine. Because of this the outlets are usually regrouped together between the engine and the pod, which leads to great lengths of discharge ducting.

However, this leads to another danger. The compressed air which escapes from the pressure relief valve when the valve opens is hot, and hence dangerous for the environment of the discharge ducting, which includes various items of equipment, fluid ducts, electric cables, the pod wall, etc.

SUMMARY OF THE INVENTION

It is an object of the present invention to provide an arrangement for discharging to atmosphere a jet of fluid which is released by a pressure relief valve in a pressurized hot fluid circuit of an aircraft, which enables the streamlined properties of the aircraft to be maintained, and which avoids damage or deterioration of the aircraft equipment in the event of operation of the pressure relief valve.

Accordingly, in an aircraft including a pressurized hot fluid circuit having a pressure relief valve, there is provided an arrangement for discharging to atmosphere a jet of fluid released by said pressure relief valve, wherein said pressure relief valve is positioned close to a wall of said aircraft such that any jet of fluid released by said valve is directed towards said wall, said wall is provided with an orifice at the position where said jet of fluid would hit said wall, and said orifice is closed by consumable plug designed to melt at least partially under the action of the heat of said jet of fluid whereby said jet is able to discharge through at least a part of said orifice.

Preferably, the consumable plug comprises a fusible material and a metallic support netting embedded in or covered by the fusible material. The fusible material may be silicone.

Preferably a sleeve is fixed to said wall around said orifice, said sleeve extending to a position adjacent said pressure relief valve to surround the path of said jet of fluid from said valve.

With the arrangement in accordance with the invention the engine pod or other wall of the aircraft retains its streamlined properties as long as the pressure relief valve has not opened. Moreover, the path of the jet of the fluid released by the valve is short and, in preferred embodiments, is protected by a sleeve. A visual check of the aircraft wall on landing will reveal any discharge which may have occurred during flight.

Other features and advantages of the invention will become apparent from the following description of a preferred embodiment with reference to the attached drawings.

DESCRIPTION OF THE PREFERRED EMBODIMENT

Figure 1:
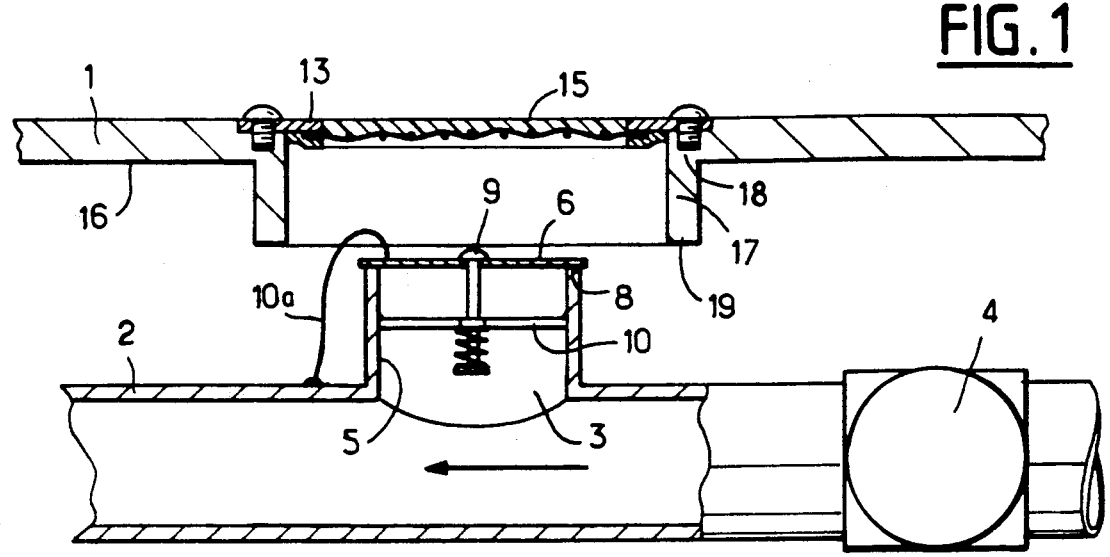
FIG. 1 is a diagrammatic, partly sectional view illustrating the principles of one embodiment of the arrangement in accordance with the invention.
Figure 2:
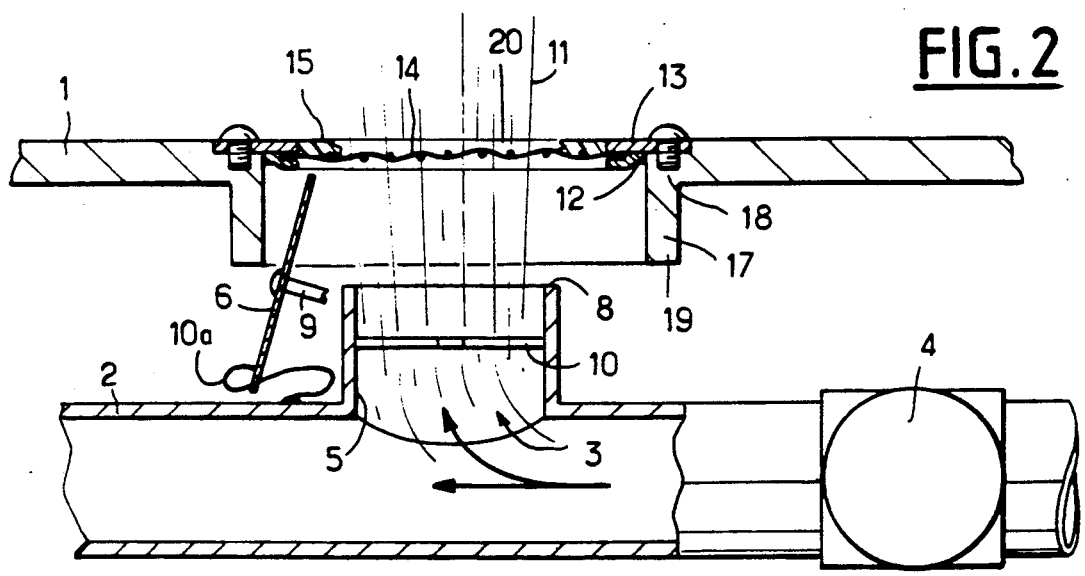
FIG. 2 is a view similar to that of FIG. 1 but showing the arrangement with the pressure relief valve open.
Figure 3:
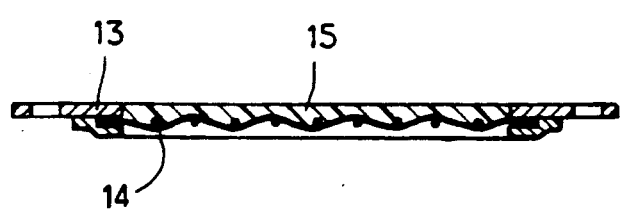
FIG. 3 is a cross-section of the plug used to close the wall orifice in the arrangement shown in FIGS. 1 and 2.

In the drawings there is shown the wall 1 of an aircraft engine pod, in the vicinity of which there is a duct 2 of a pressurized hot fluid circuit, for example a hot air circuit intended for deicing the aircraft. A pressure relief valve 3 is provided downstream of a pressure control valve 4 in the duct 2, the pressure relief valve 3 having a cylindrical port 5 communicating with the duct 2 and sealingly closed by a metal plate 6. This plate 6 is held in a fluid-tight manner on the outer rim 8 of the port 5 by means of a self-destruct rivet 9 cooperating in a known manner with struts 10 provided radially within the port 5. A retaining cord 10a connects the plate 6 to the duct 2. The rivet 9 is gauged such that when the pressure in the duct 2, downstream of the pressure control valve 4, is greater than a predetermined pressure, the rivet 9 breaks, thus releasing the metal plate 6 and permitting pressurized hot fluid flowing in the duct 2 to be discharged through the port 5.

The port 5 is located in the vicinity of the wall 1 and facing towards it, so that any jet of fluid 11 discharged by the pressure relief valve 3 is directed towards the wall 1. At the position where the jet of fluid 11 would hit the wall 1, the wall is provided with an orifice 12 closed by a consumable plug 13 comprising a metallic support netting 14 embedded in or covered by a fusible material 15, e.g. silicone, which is intended to melt, at least partly, when subjected to the heat of the hot fluid jet 11 discharged by the pressure relief valve 3. The plug 13 is fixed to the wall 1 by screws or some other suitable means. Naturally, the temperature of the jet of fluid 11 must be above the melting point of the fusible material 15, i.e. above 250° C. when the fusible material is silicone.

On its inner face 16 the pod wall 1 is provided with a sleeve 17 which extends perpendicularly to the wall 1. One end 18 of the sleeve surrounds the orifice 12, and the other end 19, which is spaced from the wall 1, lies in the vicinity surrounding the port 5 and its closure plate 6. As a result of this sleeve, the jet of fluid 11 which may be discharged by the pressure relief valve 3 does not contact the various neighbouring items of equipment, and especially the electric cabling.

The operation of the arrangement is easily understood. If there is excess pressure in the duct 2, as a result of a malfunction of the control valve 4, the calibrated rivet 9 breaks and the metal plate 6 is ejected towards the orifice 12 of the pod wall 1, thus releasing a jet of fluid 11 directed towards the consumable plug 13 closing the orifice 12. The silicone 15 covering the metallic netting 14 melts under the action of the heat from the jet of fluid 11, thus producing a hole or opening 20 in the plug 13 through which the jet of fluid 11 discharges into the atmosphere.

At the next stopover of the aircraft, a simple visual inspection of the pod enables the blow-out to be detected. After the cause of the circuit failure has been attended to and the remainder of the plug 13 has been removed, the metal plate 6 is replaced and fixed by means of a new rivet 9 and the orifice is re-sealed by a new consumable plug 13.

Obviously, numerous modifications and variations of the present invention are possible in light of the above teachings. It is therefore to be understood that within the scope of the appended claims, the invention may be practiced otherwise than as specifically described herein.

We claim:

1. A pressurized heated fluid circuit for an aircraft, which comprises:

a wall of said aircraft which has an orifice provided therein;

pressure relief valve means aligned with said orifice of said wall of said aircraft such that a jet of heated fluid released by said relief valve means is directed toward said orifice of said wall; and a consumable plug positioned in said orifice for being at least partially melted upon being contacted by said jet of heated fluid such that said jet is discharged through at least part of said orifice.

2. An arrangement according to claim 1, wherein said consumable plug comprises a fusible material and a metallic support netting embedded in or covered by said fusible material.

3. An arrangement according to claim 2, wherein said fusible material comprises silicone.

4. An arrangement according to claim 1, which comprises a sleeve fixed to said wall around said orifice, said sleeve extending to a position adjacent said pressure relief valve means to surround the path of said jet of fluid from said relief valve means.

* * * * *